United States Patent
Kang et al.

(10) Patent No.: US 10,880,079 B2
(45) Date of Patent: Dec. 29, 2020

(54) PRIVATE KEY GENERATION METHOD AND SYSTEM, AND DEVICE

(71) Applicant: HUAWEI TECHNOLOGIES CO., LTD., Guangdong (CN)

(72) Inventors: Xin Kang, Singapore (SG); Xuwu Zhang, Shenzhen (CN); Yanjiang Yang, Singapore (SG); Haiguang Wang, Singapore (SG); Zhongding Lei, Singapore (SG)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/563,316

(22) Filed: Sep. 6, 2019

(65) Prior Publication Data

US 2019/0394033 A1 Dec. 26, 2019

Related U.S. Application Data

(63) Continuation of application No. PCT/CN2018/077918, filed on Mar. 2, 2018.

(30) Foreign Application Priority Data

Mar. 8, 2017 (CN) .......................... 2017 1 0140921

(51) Int. Cl.
*H04L 29/06* (2006.01)
*H04L 9/08* (2006.01)

(52) U.S. Cl.
CPC .......... *H04L 9/0866* (2013.01); *H04L 9/0847* (2013.01)

(58) Field of Classification Search
CPC . H04L 9/08; H04L 9/083; H04L 9/085; H04L 9/0816; H04L 9/0861;
(Continued)

(56) References Cited

U.S. PATENT DOCUMENTS 6,792,530 B1 9/2004 Qu et al.
8,966,267 B1 * 2/2015 Pahl ...................... H04L 9/0844
713/171
(Continued)

FOREIGN PATENT DOCUMENTS

CN 1741449 A 3/2006
CN 101056173 A 10/2007
(Continued)

OTHER PUBLICATIONS

Groves Cesg M: Elliptic Curve-Based Certificateless Signatures for Identity-Based Encryption (ECCSI); rfc6507, Feb. 2, 2012,total 18 pages.
(Continued)

*Primary Examiner* — Yogesh Paliwal
(74) *Attorney, Agent, or Firm* — Womble Bond Dickinson (US) LLP

(57) ABSTRACT

This application discloses a private key generation method and system, and a device. The method includes: sending, by a first network device, a first request to a second network device, where the first request includes a first parameter set; receiving, by the first network device, a first response message returned by the second network device, where the first response message includes a first sub-private key and a second parameter set, the first sub-private key is generated based on the first parameter set, and the first sub-private key is generated for a terminal device; generating, by the first network device, a second sub-private key based on the second parameter set, where the second sub-private key is generated for the terminal device; and synthesizing, by the first network device, the first sub-private key and the second sub-private key into a joint private key according to a synthesis formula.

20 Claims, 5 Drawing Sheets

(58) Field of Classification Search
CPC ... H04L 9/0866; H04L 9/0847; H04L 9/0894; H04L 63/062
See application file for complete search history.

(56) References Cited

U.S. PATENT DOCUMENTS

| | | | |
|---|---|---|---|
| 2006/0285683 A1* | 12/2006 | Anatharaman | H04L 9/085 380/30 |
| 2009/0154711 A1 | 6/2009 | Jho et al. | |
| 2009/0187767 A1 | 7/2009 | Iwamura | |
| 2010/0042842 A1* | 2/2010 | Huang | H04L 9/3236 713/176 |
| 2013/0179684 A1 | 7/2013 | Furukawa | |

FOREIGN PATENT DOCUMENTS

| | | |
|---|---|---|
| CN | 106161472 A | 11/2016 |
| WO | 2011033259 A2 | 3/2011 |

OTHER PUBLICATIONS

M. Groves "Elliptic Curve-Based Certificateless Signatures for Identity-Based Encryption (ECCSI)",Internet Engineering Task Force (IETF),Request for Comments: 6507,total 17 pages.

Huawei et al: "Security for V2X Broadcast Communication: Introducing Temporary ID management Function for V2X Data Source Accountability", 3GPP Draft; S3-161169,Jul. 29, 2016,total 8 pages.

3GPP TS 33.401 V141.0 (Dec. 2016);3rd Generation Partnership Project;Technical Specification Group Services and System Aspects;3GPP System Architecture Evolution (SAE);Security architecture(Release 14);total 152 pages.

Yuchen Zhang et al: "Identity-Based Threshold Key Management for Ad Hoc Networks",Dec. 19, 2008,total 6 pages.

3GPP TR 33.899 V0.7.0 (Feb. 2017);3rd Generation Partnership Project;Technical Specification Group Services and System Aspects;Study on the security aspects of the next generation system(Release 14);total 470 pages.

Balasubramanian A et al: "Analysis of a hybrid key management solution for ad hoc networks",Mar. 13, 2005, total 6 pages.

* cited by examiner

PRIVATE KEY GENERATION METHOD AND SYSTEM, AND DEVICE

CROSS-REFERENCE TO RELATED APPLICATIONS

This application is a continuation of International Application No. PCT/CN2018/077918, filed on Mar. 2, 2018, which claims priority to Chinese Patent Application No. 201710140921.1, filed on Mar. 8, 2017. The disclosures of the aforementioned applications are hereby incorporated by reference in their entireties.

TECHNICAL FIELD

This application relates to the communications field, and in particular, to a private key generation method and system, and a device.

BACKGROUND

Currently, increasingly shrunk voice and SMS message services create increasingly fewer benefits for telecom operators. Therefore, the telecom operators focus on a vertical industry market such as a remote meter reading service in the power industry, and the telecom operators increasingly cooperate with vertical industry customers. One of important factors that affect operation network selection by the vertical industry customers is network security, especially authentication of a terminal device. In the prior art, an authentication manner of a terminal device is based on a symmetric key system, to be specific, the telecom operator and the terminal device prestore a same authentication key, and perform authentication by using the authentication key. However, for the vertical industry customer, the authentication key is completely controlled by the telecom operator, and consequently security of digital assets of the vertical industry customer cannot be ensured, and an intention of the vertical industry customer to select an operation network of the telecom operator is affected.

SUMMARY

Embodiments of this application provide a private key generation method and system, and a device, so that a key that is trusted by both a telecom operator and a vertical industry customer but is not controlled by the telecom operator can be generated.

According to a first aspect, a private key generation method system is provided, where the system includes a first network device and a second network device, where the first network device is configured to send a first request to the second network device, where the first request includes a first parameter set; the second network device is configured to generate a first sub-private key based on the first parameter set, where the first sub-private key is generated for a terminal device; the second network device is configured to send a first response message to the first network device, where the first response message includes a second parameter set and the first sub-private key; the first network device is configured to generate a second sub-private key based on the second parameter set, where the second sub-private key is generated for the terminal device; and the first network device is configured to synthesize the first sub-private key and the second sub-private key to obtain a joint private key.

According to a second aspect, a private key generation method is provided, where the method is applied to a first network device side, and includes: sending, by a first network device, a first request to a second network device, where the first request includes a first parameter set; receiving, by the first network device, a first response message returned by the second network device, where the first response message includes a first sub-private key and a second parameter set, the first sub-private key is generated based on the first parameter set, and the first sub-private key is generated for a terminal device; generating, by the first network device, a second sub-private key based on the second parameter set, where the second sub-private key is generated for the terminal device; and synthesizing, by the first network device, the first sub-private key and the second sub-private key into a joint private key according to a synthesis formula.

According to a third aspect, a private key generation method is provided, where the method is applied to a second network device side, and includes: receiving, by a second network device, a first request sent by a first network device, where the first request includes a first parameter set; generating, by the second network device, a first sub-private key based on the first parameter set, where the first sub-private key is generated for a terminal device; and sending, by the second network device, a first response message to the first network device, where the first response message includes the first sub-private key and a second parameter set, the second parameter set is used to generate a second sub-private key, the second sub-private key is generated for the terminal device, and the first sub-private key and the second sub-private key may be synthesized into a joint private key according to a synthesis formula.

The private key generation method is described separately from perspectives of the system, the first network device side, and the second network device side in the first aspect, the second aspect, and the third aspect. By implementing the method, the second network device generates the first sub-private key, the first network device generates the second sub-private key, and the first network device synthesizes the joint private key based on the first sub-private key and the second sub-private key. Because the joint private key is generated based on the first sub-private key, the joint private key can be trusted by the second network device (a telecom operator). In addition, because the joint private key is generated also based on the second sub-private key, the joint private key can also be trusted by the first network device (a vertical industry customer). However, because the second network device knows only the first sub-private key but does not know the second sub-private key, the joint private key is not controlled by the telecom operator.

In one embodiment, the first parameter set includes at least one of a device identifier, a first public validation token, and a first global public key. The device identifier is an identifier of the terminal device, the first public validation token is a public validation token generated by the first network device for the terminal device, and the first global public key is a public key generated by the first network device. The second parameter set includes at least one of a second public validation token and a second global public key, the second public validation token is a public validation token generated by the second network device for the terminal device, and the second global public key is a public key generated by the second network device.

In this embodiment, transmission is performed between the first network device and the second network device through a secure channel, and the first request and the first response message are not stolen, modified, or counterfeited in theory. Therefore, the first parameter set may include only at least one of the device identifier, the first public validation token, and the first global public key that are required for calculating the first sub-private key. The second parameter set may include only at least one of the second public validation token and the second global public key that are required for calculating the second sub-private key.

In one embodiment, in addition to at least one of the device identifier, the first public validation token, and the first global public key, the first parameter set further includes a first verification code, where the first verification code is used to verify the first request. In addition to at least one of the second public validation token and the second global public key, the second parameter set further includes a second verification code, where the second verification code is used to verify the first response message.

In this embodiment, transmission is performed between the first network device and the second network device through an insecure channel, and the first request and the first response message may be stolen, modified, or counterfeited. Therefore, the first verification code needs to be added to the first parameter set to protect the first request, and the second verification code needs to be added to the second parameter set to protect the first response message.

In one embodiment, in addition to at least one of the device identifier, the first public validation token, and the first global public key, the first parameter set further includes a first signature and a first certificate, where the first signature is a signature of the first network device for the first request, and the first certificate is used to prove an identity of the first network device. In addition to at least one of the second public validation token and the second global public key, the second parameter set further includes a second signature and a second certificate, where the second signature is a signature of the second network device for the first response message, and the second certificate is used to prove an identity of the second network device.

In this embodiment, transmission is performed between the first network device and the second network device through an insecure channel, and the first request and the first response message may be stolen, modified, or counterfeited. Therefore, the first signature and the first certificate need to be added to the first parameter set to protect the first request, and the second signature and the second certificate need to be added to the second parameter set to protect the first response message.

According to a fourth aspect, a network device is provided, and includes a unit configured to perform the method according to the second aspect.

According to a fifth aspect, a network device is provided, and includes a unit configured to perform the method according to the third aspect.

According to a sixth aspect, a network device is provided, and includes a memory, a processor coupled to the memory, and a communications module, where the communications module is configured to send or receive externally sent data, the memory is configured to store implementation code for the method described in the second aspect, and the processor is configured to execute program code stored in the memory, in other words, perform the method described in the second aspect.

According to a seventh aspect, a network device is provided, and includes a memory, a processor coupled to the memory, and a communications module, where the communications module is configured to send or receive externally sent data, the memory is configured to store implementation code for the method described in the third aspect, and the processor is configured to execute program code stored in the memory, in other words, perform the method described in the third aspect.

According to an eighth aspect, a computer readable storage medium is provided, where the computer readable storage medium stores an instruction, and when the instruction is run on a computer, the computer performs the method according to the first aspect.

According to a ninth aspect, a computer readable storage medium is provided, where the computer readable storage medium stores an instruction, and when the instruction is run on a computer, the computer performs the method according to the second aspect.

According to a tenth aspect, a computer program product including an instruction is provided, where when the computer program product is run on a computer, the computer performs the method according to the first aspect.

According to an eleventh aspect, a computer program product including an instruction is provided, where when the computer program product is run on a computer, the computer performs the method according to the second aspect.

DESCRIPTION OF DRAWINGS

To describe the technical solutions in the embodiments of this application more clearly, the following briefly describes the accompanying drawings required for describing the embodiments.

DESCRIPTION OF EMBODIMENTS

Figure 1:
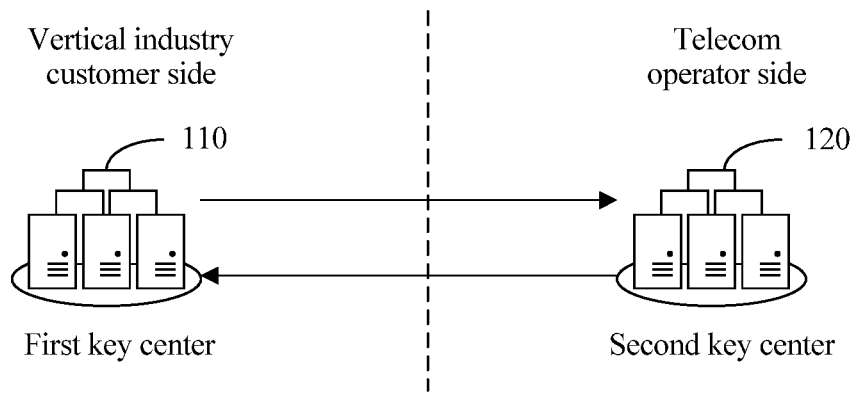
FIG. 1 is a schematic diagram of a communications system according to an embodiment of this application.

The following clearly describes technical solutions of embodiments in this application with reference to accompanying drawings.

A communications system to which the embodiments of this application are applied is first described. The communications system in the embodiments includes a first network device 110 and a second network device 120 that can communicate with each other. The first network device 110 is disposed on a vertical industry customer side, and the first network device 110 serves a vertical industry customer. The second network device 120 is disposed on a telecom operator side, and the second network device 120 serves a telecom operator.

In the embodiments of this application, the first network device 110 is responsible for generating and distributing a private key of a terminal device, and is separately deployed as an independent logical function entity. The first network device 110 may be a private key generation center (KGC) or the like. It may be understood that the private key generation center may have different actual product names in different systems. For example, in some systems, the private key generation center is referred to as a private key generator (PKG). Certainly, a change of the product name does not affect essence of the private key generation center. The second network device 120 is similar to the first network device 110, and details are not described herein.

In the embodiments of this application, the first network device 110 and the second network device 120 may communicate with each other through a secure channel, or not through a secure channel. A secure channel is a communication channel on which security protection is performed. When two communication parties communicate with each other through the secure channel, a third party cannot learn of communication content. When two communication parties communicate with each other not through the secure channel, a third party can learn of communication content. For example, the secure channel may be an HTTPS (Hyper Text Transfer Protocol over Secure Socket Layer) channel or a TLS (Transport Layer Security) channel. It should be understood that the foregoing example is merely used as an example, and should not constitute a specific limitation.

In the embodiments of this application, the first network device 110 and the second network device 120 generate a private key of the terminal device by using an identity-based cryptography (IBC) mechanism. In one embodiment, the first network device 110 and the second network device 120 generate the private key of the terminal device according to the IETF standard RFC 6507. In the identity-based cryptography mechanism, a public key is a character string having a special meaning, for example, an email address or a telephone number.

To resolve the foregoing problems, the embodiments of this application provide a private key generation method and system, and a device, so that a key that is trusted by both a telecom operator and a vertical industry customer but is not controlled by the telecom operator can be generated. The following separately provides detailed descriptions.

Figure 2:
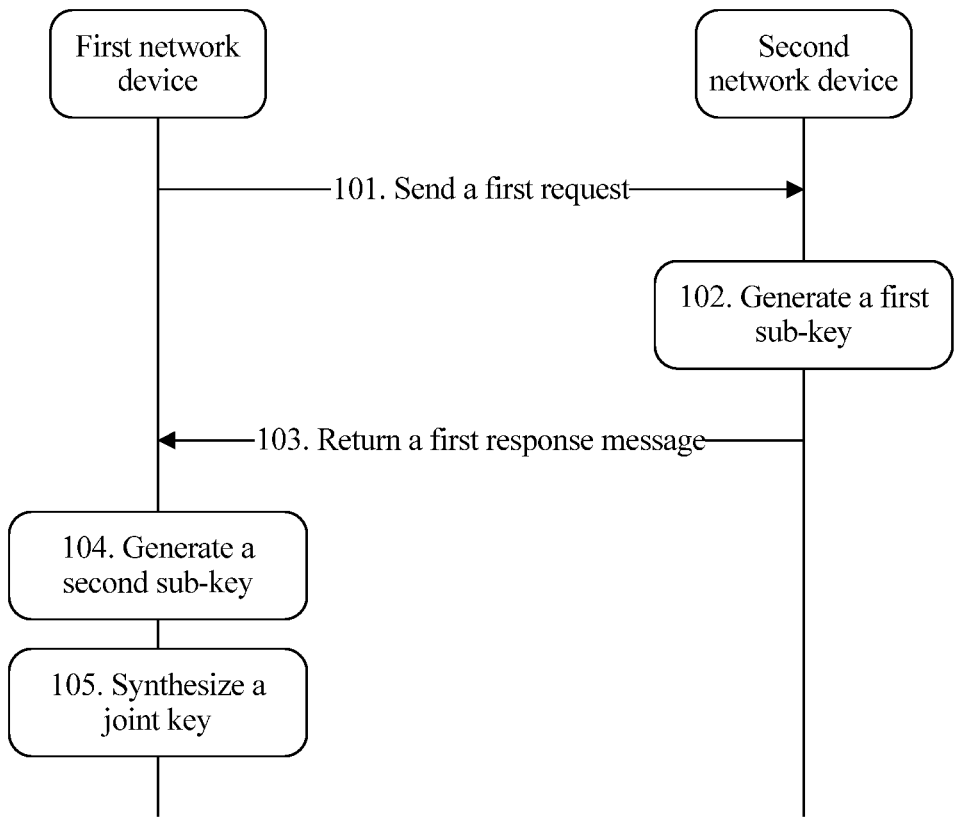
FIG. 2 is an interaction diagram of a private key generation method according to an embodiment of this application.

FIG. 2 is an interaction diagram of a private key generation method according to an embodiment of this application. As shown in FIG. 2, the method includes the following operations.

Operation 201. A first network device sends a first request to a second network device, where the first request includes a first parameter set. Correspondingly, the second network device receives the first request sent by the first network device.

In this embodiment of this application, the first parameter set includes at least one of a first indication, a device identifier, a first public validation token, and a first global public key.

In this embodiment of this application, the first indication is used to request the second network device to jointly generate a joint private key. For example, the first indication may be a data bit. When the data bit is set to 1, it indicates that the second network device is requested to jointly generate the joint private key. The foregoing example is merely used as an example, and cannot be used as a specific limitation.

In this embodiment of this application, the device identifier is an identifier of a terminal device. The terminal device is a device that performs security protection by using a joint private key generated in the last operation 205. Security is at least one of encryption, integrity, and non-repudiation. Encryption means that a keep-alive packet becomes an unreadable ciphertext after being processed by using an algorithm, to prevent the keep-alive packet from being illegally stolen and read. Integrity means that a keep-alive packet is not illegally added, deleted, replaced, and the like during transmission. Non-repudiation of a keep-alive packet means that the terminal device cannot deny behavior of sending the keep-alive packet and content of the keep-alive packet. For example, the terminal device may use the joint private key to perform encryption, signature, and authentication on data. This is not specifically limited herein.

In this embodiment of this application, the terminal device is a logical entity, and may be specifically any one of user equipment, an internet of things (IoT) device, and the like. The user equipment may be a smartphone, a smartwatch, a smart tablet, or the like. The internet of things device may be a sensor, an electricity meter, a water meter, or the like. In a specific embodiment, the terminal device is an internet of things device that is disposed at a special geographical location and that cannot be directly powered by a power grid but can be powered only by a battery disposed in the internet of things device. For example, the terminal device may be a low-power camera media device such as a smart doorbell, may be a meter device such as a smart water meter or a smart electricity meter that is disposed in a dark corner of a high building, may be a biological health device such as a heart pacemaker that is embedded in a human body, or may be a weather monitoring device disposed in a barren countryside.

In this embodiment of this application, the identifier of the terminal device may be a media access control (MAC) address, an internet protocol (IP) address, a mobile number, an international mobile equipment identity (IMEI), an international mobile subscriber identity (IMSI), an IP multimedia private identity (IMPI), a temporary mobile subscriber identity (TMSI), an IP multimedia public identity (IMPU) a globally unique temporary UE identity (GUTI), or the like.

In this embodiment of this application, the first global public key is a public key held by the first network device. The first global public key is generated by the first network device based on a global private key and a global parameter of the first network device. For example, in the RFC 6507, $$KPAK1=[KSAK1]G, \text{ where}$$

KPAK1 is the first global public key; KSAK1 is a first global key, where the first global key is a key held by the first network device; and G is the global parameter.

In this embodiment of this application, the first public validation token is a public validation token (PVT) generated by the first network device for the terminal device. For details of a definition of a public validation token, refer to the IETF standard RFC 6507. In a specific embodiment, the first network device may obtain the first public validation token through calculation according to the following formula:

$$PVT1=[v1]G, \text{ where}$$

PVT1 is the first public validation token, v1 is a random number selected by the first network device from a finite field F_q generated by a prime number q, and G is a point on an elliptic curve. It may be understood that PVT1 and the identifier of the terminal device may constitute a public key.

Operation 202. The second network device generates a first sub-private key based on the first parameter set.

In this embodiment of this application, after receiving the first request, the second network device learns, according to the first indication, that the second network device and the first network device need to jointly generate the joint private key. Then, the second network device generates the first sub-private key according to the following formula:

$$SSK1=KSAK2+HS*v2 \bmod q, \text{ where}$$

SSK1 is the first sub-private key; KSAK2 is a second global key, where the second global key is a key held by the second network device; HS is a hash parameter; q is a prime number; and v2 is a random number selected by the second network device from a finite field F_q generated by the prime number q.

In this embodiment of this application, a second global public key is a public key held by the second network device. The second global public key is generated by the second network device based on a global private key and a global parameter of the second network device. For example, in the FRC 6507, $$KPAK2=[KSAK2]G, \text{ where}$$

KPAK2 is the second global public key; KSAK2 is a second global key, where the second global key is a key held by the second network device; and G is the global parameter.

In this embodiment of this application, the hash parameter may be generated by the second network device according to the following formula:

$$HS=\text{hash}(KPAK1\|KPAK2\|ID\|PVT\_U), \text{ where}$$

HS is the hash parameter, hash( ) is a hash function, KPAK1 is the first global public key, ID is the device identifier, and PVT_U is a joint public validation token.

In this embodiment of this application, a second public validation token is a public validation token generated by the second network device for the terminal device. In a specific embodiment, the second network device may obtain the second public validation token through calculation according to the following formula:

$$PVT2=[v2]G, \text{ where}$$

PVT2 is the second public validation token, v2 is a random number selected by the second network device from a finite field F_q generated by a prime number q, and G is a point on an elliptic curve.

In this embodiment of this application, the joint public validation token may be generated by the second network device according to the following formula:

$$PVT\_U=PVT1*PVT2, \text{ where}$$

PVT_U is the joint public validation token, PVT1 is the first public validation token generated by the first network device, and PVT2 is the second public validation token generated by the second network device. It may be understood that the foregoing example is merely used as an example, and should not constitute a specific limitation.

In this embodiment of this application, the second network device may synthesize a joint public key based on the joint public validation token and the device identifier, and store the joint public key in the second network device. The joint public key is paired with the joint private key generated in the last operation 205, in other words, when one of two communication parties uses the joint private key to perform digital signature, the other one may use the joint public key to perform verification. It may be understood that the joint public key stored in the second network device may be provided for a telecom operator for use. For example, when the terminal device uses the joint private key to perform signature, the telecom operator may use the joint public key to perform authentication on the signature.

Operation 203. The second network device returns a first response message to the first network device, where the first response message includes the first sub-private key and a second parameter set. Correspondingly, the first network device receives the first response message returned by the second network device.

Operation 204. The first network device generates a second sub-private key based on the second parameter set.

In this embodiment of this application, after receiving the first response message, the first network device generates the second sub-private key according to the following formula:

$$SSK2=KSAK1+HS*v1 \bmod q, \text{ where}$$

SSK2 is the second sub-private key; KSAK1 is a first global key, where the first global key is a key held by the first network device; HS is a hash parameter; q is a prime number; and v1 is a random number selected by the first network device from a finite field F_q generated by the prime number q.

In a specific embodiment, the second network device may send the hash parameter calculated by the second network device in operation 202 to the first network device. In this case, the second parameter set sent by the second network device to the first network device includes at least the hash parameter. It may be understood that the second network device directly sends the hash parameter to the first network device, so that the first network device does not need to calculate the hash parameter, thereby effectively reducing a calculation amount of the first network device.

In a specific embodiment, the first network device may calculate the hash parameter according to the following formula:

$$HS=\text{hash}(KPAK1\|KPAK2\|ID\|PVT\_U), \text{ where}$$

HS is the hash parameter, hash( ) is a hash function, KPAK1 is the first global public key, KPAK2 is the second global public key, ID is the device identifier prestored in the first network device, and PVT_U is the joint validation token. In this case, the second parameter set sent by the second network device to the first network device includes at least the second global public key and the second public validation token.

In this embodiment of this application, the joint public validation token may be generated by the first network device according to the following formula:

$$PVT\_U=PVT1*PVT2, \text{ where}$$

PVT_U is the joint public validation token, PVT1 is the first public validation token generated by the first network device, and PVT2 is the second public validation token generated by the second network device. It may be understood that the foregoing example is merely used as an example, and should not constitute a specific limitation.

In this embodiment of this application, the joint public key in the first network device may be generated by the first network device based on the joint public validation token and the device identifier, or may be sent by the second network device to the first network device. This is not specifically limited in this application. When the second network device sends the joint public key to the first network device, the second parameter set sent by the second network device to the first network device includes at least the joint public key. It may be understood that the joint public key stored in the first network device may be provided for a vertical industry customer for use. For example, when the terminal device uses the joint private key to perform signature, the vertical industry customer may use the joint public key to perform authentication on the signature.

Operation 205. The first network device synthesizes the first sub-private key and the second sub-private key into the joint private key according to a synthesis formula.

In this embodiment of this application, the first network device synthesizes the first sub-private key and the second sub-private key into the joint private key according to a summation formula:

$$SSK=SSK1+SSK2, \text{ where}$$

SSK is the joint private key, SSK1 is the first sub-private key, and SSK2 is the second sub-private key. It may be understood that the first network device may alternatively synthesize the first sub-private key and the second sub-private key into the joint private key according to a subtraction formula:

$$SSK=SSK1-SSK2$$

However, in this case, the joint public validation token is generated according to the following formula:

$$PVT\_U=PVT1/PVT2.$$

In this embodiment of this application, after synthesizing the joint private key, the first network device may send the joint private key to the terminal device in a wired or wireless manner. The wired manner includes but is not limited to RS232, RS485, a printer port, a network cable, and the like. The wireless manner includes a long-range wireless manner and a short-range wireless manner. The long-range wireless manner includes a general packet radio service (GPRS), a global system for mobile communications (GSM), second-generation to fifth-generation (The 2nd-5th Generation, 2G-5G) mobile communications technologies, even a subsequent evolved mobile communications technology, and the like. The short-range wireless manner includes but is not limited to Bluetooth, ZigBee, a wireless local area network (WLAN), an ultra-wideband (UWB) technology, a radio frequency identification (RFID) technology, near field communication (NFC), and the like.

In this embodiment of this application, the second network device generates the first sub-private key, the first network device generates the second sub-private key, and the first network device synthesizes the first sub-private key and the second sub-private key into the joint private key. Because the joint private key is generated based on the first sub-private key, the joint private key can be trusted by the second network device (a telecom operator). In addition, because the joint private key is generated also based on the second sub-private key, the joint private key can also be trusted by the first network device (a vertical industry customer). However, because the second network device knows only the first sub-private key but does not know the second sub-private key, the joint private key is not controlled by the telecom operator.

It may be understood that the joint private key is the basis of subsequent communication, and absolutely cannot be leaked. Therefore, it needs to be ensured that communication between the first network device and the second network device is secure. Several main implementations of secure communication between the first network device and the second network device according to embodiments of this application are described below with reference to FIG. 3A to FIG. 3C.

Figure 3A:
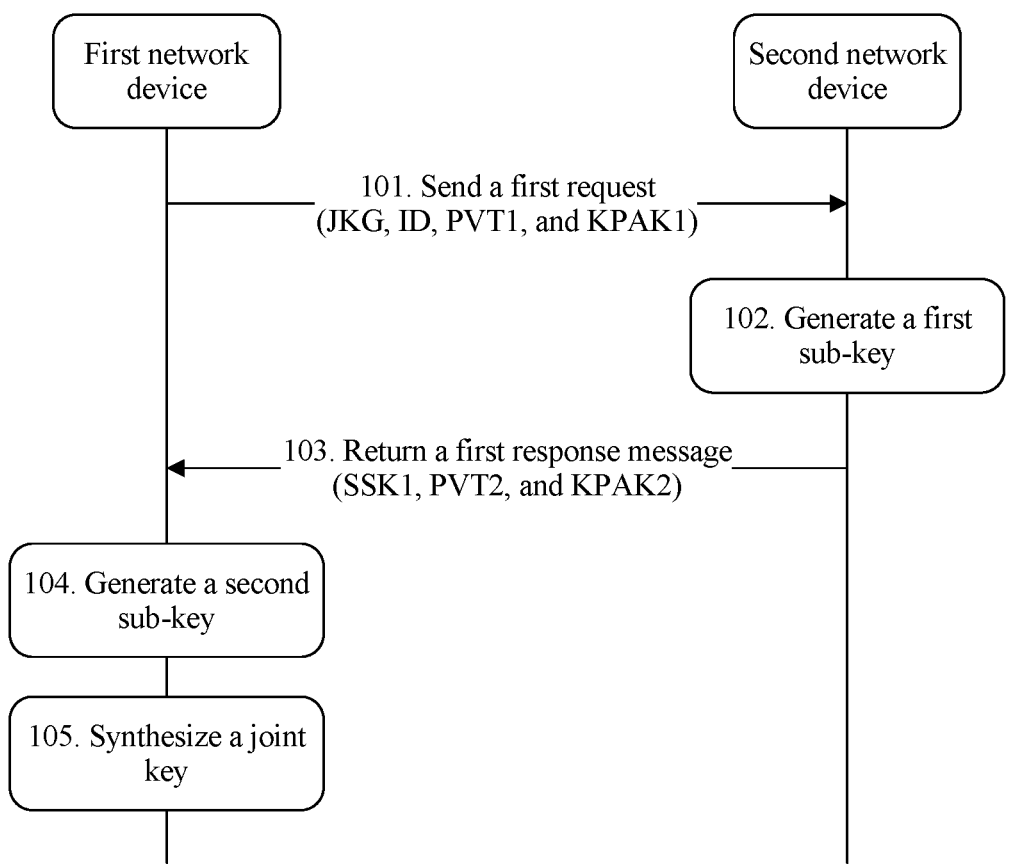
FIG. 3A to FIG. 3C are interaction diagrams of several main implementations of secure communication between a first network device and a second network device according to an embodiment of this application.

As shown in FIG. 3A, the first network device and the second network device communicate with each other through a secure channel, in other words, there is no possibility in theory that the first request and the first response message between the first network device and the second network device center are stolen, counterfeited, or modified by a third party. Therefore, the first request sent by the first network device to the second network device only needs to carry a parameter required for calculating the first sub-private key, and does not need to carry an extra parameter used to perform security protection on the first request. For example, the first request sent by the first network device to the second network device only needs to carry at least one of the first indication (JKG), the device identifier (ID), the first public validation token (PVT1), and the first global public key (KPAK1).

Likewise, the first response message sent by the second network device to the first network device only needs to carry the first sub-private key and a parameter required for calculating the second sub-private key, and does not need to carry an extra parameter used to perform security protection on the first response message. For example, the first response message sent by the second network device to the first network device only needs to carry at least one of the first sub-private key (SSK1), the second public validation token (PVT2), and the second global public key (KPAK2).

Figure 3B:
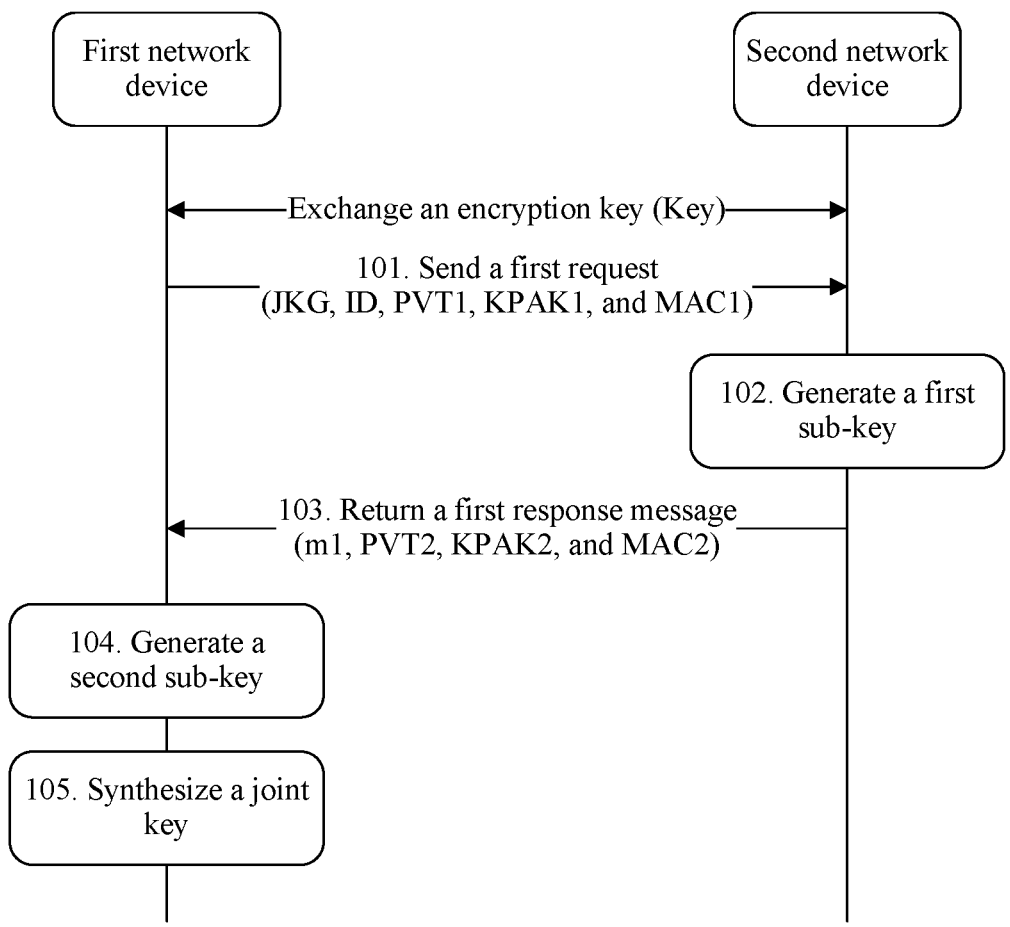

As shown in FIG. 3B, the first network device and the second network device do not communicate with each other through a secure channel, in other words, there is a possibility that the first request and the first response message transmitted between the first network device and the second network device center may be stolen, counterfeited, or modified by a third party. Therefore, in addition to a parameter required for calculating the first sub-private key, the first request sent by the first network device to the second network device further needs to carry an extra parameter used to perform security protection on the first request. For example, in addition to at least one of the first indication (JKG), the device identifier (ID), the first public validation token (PVT1), and the first global public key (KPAK1), the first request sent by the first network device to the second network device further needs to carry a first verification code (MAC1). After receiving the first request, the second network device verifies the first request based on the first verification code. If the verification fails, the second network device discards the first request.

Likewise, in addition to the first sub-private key and a parameter required for calculating the second sub-private key, the first response message sent by the second network device to the first network device further needs to carry an extra parameter used to perform security protection on the first response message. For example, in addition to at least one of the first sub-private key (SSK1), the second public validation token (PVT2), and the second global public key (KPAK2), the first response message sent by the second network device to the first network device further needs to carry a second verification code (MAC2). After receiving the first response message, the first network device verifies the first response message based on the second verification code. If the verification fails, the first network device discards the first response message.

In a specific embodiment, the first verification code may be calculated according to the following formula:

$$MAC1=SHA256(Key,JKC\|ID\|PVT1\|KPAK1), \text{ where}$$

Key is an encryption key, where the encryption key is exchanged between the first network device and the second network device. It should be understood that the foregoing example is merely used as an example, and should not constitute a specific limitation.

In a specific embodiment, the second verification code may be calculated according to the following formula:

$$MAC2=SHA256(Key,SSK1\|PVT2\|KPAK2), \text{ where}$$

Key is an encryption key, where the encryption key is exchanged between the first network device and the second network device. It should be understood that the foregoing example is merely used as an example, and should not constitute a specific limitation.

Further, to improve security of the first sub-private key, the encryption key may be further used to encrypt the first sub-private key in the first response message into a ciphertext from a plaintext. In a specific embodiment, the ciphertext of the first sub-private key may be calculated according to the following formula:

$$m1=E(SSK1,Key), \text{ where}$$

m1 is the ciphertext of the first sub-private key, E(.) is a packet encryption algorithm, SSK1 is the plaintext of the first sub-private key, and Key is an encryption key. In this case, the second verification code may be calculated according to the following formula:

$$MAC2=SHA256(Key,m1\|PVT2\|KPAK2), \text{ where}$$

Key is an encryption key, and m1 is the ciphertext of the first sub-private key.

Figure 3C:
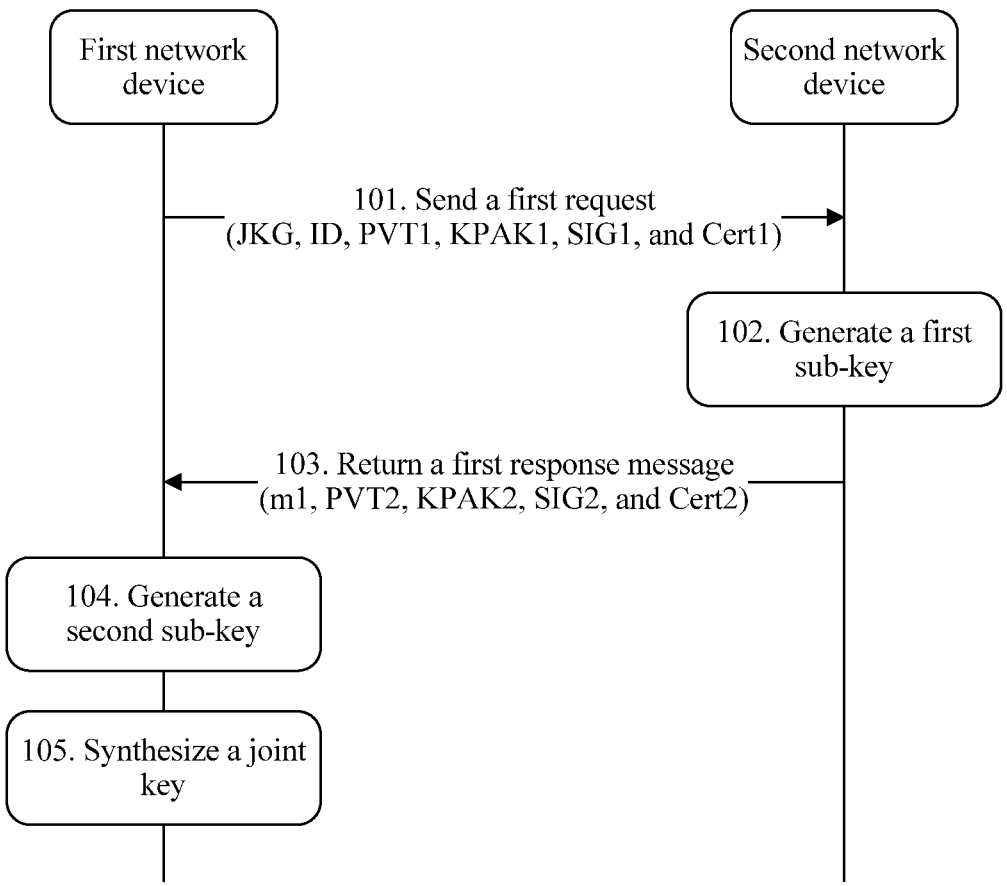

As shown in FIG. 3C, the first network device and the second network device do not communicate with each other through a secure channel, in other words, there is a possibility that the first request and the first response message transmitted between the first network device and the second network device center may be stolen, counterfeited, or modified by a third party. Therefore, in addition to a parameter required for calculating the first sub-private key, the first request sent by the first network device to the second network device further needs to carry an extra parameter used to perform security protection on the first request. For example, assuming that the first network device and the second network device each have a public/private key pair used for digital signature and a certificate of a public key, in addition to at least one of the first indication (JKG), the device identifier (ID), the first public validation token (PVT1), and the first global public key (KPAK1), the first request sent by the first network device to the second network device further needs to carry a first signature (SIG1) and a first certificate (Cert1). The first signature is a signature of the first network device for the first request, and is used to protect integrity of the first request. The first certificate is used to prove an identity of the first network device. After receiving the first request, the second network device verifies the first request based on the first signature and the first certificate. If the verification fails, the second network device discards the first request.

Likewise, in addition to the first sub-private key and a parameter required for calculating the second sub-private key, the first response message sent by the second network device to the first network device further needs to carry an extra parameter used to perform security protection on the first response message. For example, in addition to at least one of the first sub-private key (SSK1), the second public validation token (PVT2), and the second global public key (KPAK2), the first response message sent by the second network device to the first network device further needs to carry a second signature a first signature (SIG1) and a first certificate (Cert1). The second signature is a signature of the second network device for the first response message, and is used to protect integrity of the first response message. The second certificate is used to prove an identity of the second network device. After receiving the first response message, the first network device verifies the first response message based on the second signature and the second certificate. If the verification fails, the first network device discards the first response message.

Figure 4:
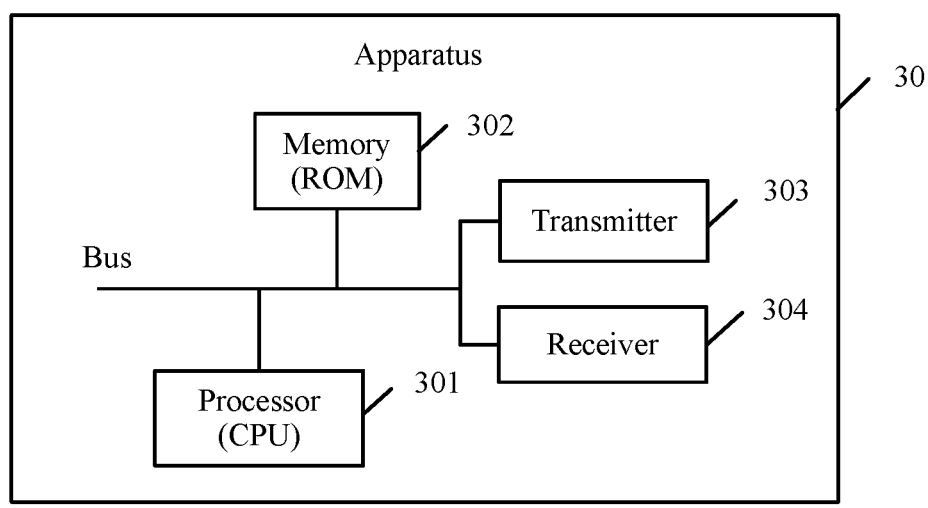
FIG. 4 is a schematic structural diagram of an apparatus according to an embodiment of this application.

Based on a same inventive concept, an embodiment of the present invention further provides an apparatus (shown in FIG. 4). The apparatus is configured to implement the method described in the embodiment in FIG. 2. As shown in FIG. 4, an apparatus 30 includes a transmitter 303, a receiver 304, a memory 302, and a processor 301 coupled to the memory 302 (there may be one or more processors 301, and an example in which there is one processor is used in FIG. 4). The transmitter 303, the receiver 304, the memory 302, and the processor 301 may be connected by using a bus or in another manner (an example in which the transmitter 303, the receiver 304, the memory 302, and the processor 301 are connected by using the bus is used in FIG. 4). The transmitter 303 is configured to send data to the outside, and the receiver 304 is configured to receive data from the outside. The memory 302 is configured to store program code, and the processor 301 is configured to invoke and run the program code stored in the memory 302.

When the apparatus 30 is a first network device, the program code stored in the memory 302 is specifically used to implement functions of the first network device in the embodiment in FIG. 2. In one embodiment, the processor 301 is configured to invoke the program code stored in the memory 302, so that the following operations are performed:

The transmitter 303 is configured to send a first request to a second network device. The first request includes a first parameter set.

The receiver 304 is configured to receive a first response message returned by the second network device. The first response message includes a first sub-private key and a second parameter set, the first sub-private key is generated based on the first parameter set, and the first sub-private key is generated for a terminal device.

The processor 301 generates a second sub-private key based on the second parameter set. The second sub-private key is generated for the terminal device.

The processor 301 synthesizes the first sub-private key and the second sub-private key into a joint private key according to a synthesis formula.

In one embodiment, the first parameter set includes at least one of a device identifier, a first public validation token, and a first global public key. The device identifier is an identifier of the terminal device, the first public validation token is a public validation token generated by the first network device for the terminal device, and the first global public key is a public key generated by the first network device.

In one embodiment, the first parameter set further includes a first verification code, and the first verification code is used to verify the first request.

In one embodiment, the first verification code is calculated by using at least one of the first indication, the device identifier, the first public validation token, and the first global public key as an input of a first hash function.

In one embodiment, the first parameter set further includes a first signature and a first certificate, the first signature is a signature of the first network device for the first request, and the first certificate is used to prove an identity of the first network device.

In one embodiment, the second parameter set includes at least one of a second public validation token and a second global public key, the second public validation token is a public validation token generated by the second network device for the terminal device, and the second global public key is a public key generated by the second network device. The processor 301 is configured to generate the second sub-private key based on at least one of the device identifier, the second public validation token, and the second global public key.

In one embodiment, the second parameter set further includes a second verification code, and the first network device verifies the first response message based on the second verification code.

In one embodiment, the second verification code is calculated by using at least one of the first private key, the second public validation token, and the second global public key as an input of a second hash function.

In one embodiment, the second parameter set further includes a second signature and a second certificate, the second signature is a signature of the second network device for the first response message, and the second certificate is used to prove an identity of the second network device. The processor 301 verifies the first response message based on the second signature and the second certificate.

In one embodiment, the second parameter set includes a hash parameter, the hash parameter is calculated by using the device identifier, the first public validation token, the first global public key, and a second global public key as inputs of a third hash function, and the second global public key is a public key generated by the second network device. The processor 301 is configured to generate the second sub-private key based on the hash parameter.

In one embodiment, the hash parameter is calculated based on the third hash function:

$$HS=\text{hash}(KPAK1\|KPAK2\|ID\|PVT), \text{ where}$$

HS is the hash parameter, hash( ) is the third hash function, KPAK1 is the first global public key, KPAK2 is the second global public key, ID is the device identifier, and PVT=PVT1*PVT2, where PVT1 is the first public validation token, and PVT2 is the second public validation token.

In one embodiment, the processor 301 is configured to synthesize the first sub-private key and the second sub-private key into the joint private key according to a summation formula:

$$SSK=SSK1+SSK2, \text{ where}$$

SSK is the joint private key, SSK1 is the first sub-private key, and SSK2 is the second sub-private key.

In one embodiment, the processor 301 is configured to synthesize the first sub-private key and the second sub-private key into the joint private key according to a subtraction formula:

$$SSK=SSK1-SSK2, \text{ where}$$

SSK is the joint private key, SSK1 is the first sub-private key, and SSK2 is the second sub-private key.

It should be noted that, when the apparatus 30 is a first network device, for execution operations of the processor 301 and other technical features related to the processor 301, refer to related content of the first network device in the method embodiment in FIG. 2. Details are not described herein again.

When the apparatus 30 is a second network device, the program code stored in the memory 302 is specifically used to implement functions of the second network device in the embodiment in FIG. 2. In one embodiment, the processor 301 is configured to invoke the program code stored in the memory 302, so that the following operations are performed:

The receiver 304 is configured to receive a first request sent by a first network device. The first request includes a first parameter set.

The processor 301 is configured to generate a first sub-private key based on the first parameter set. The first sub-private key is generated for a terminal device.

The transmitter 303 is configured to send a first response message to the first network device. The first response message includes the first sub-private key and a second parameter set, the second parameter set is used to generate a second sub-private key, the second sub-private key is generated for the terminal device, and the first sub-private key and the second sub-private key may be synthesized into a joint private key according to a synthesis formula.

In one embodiment, the first parameter set includes at least one of a device identifier, a first public validation token, and a first global public key, the device identifier is an identifier of the terminal device, the first public validation token is a public validation token generated by the first network device for the terminal device, and the first global public key is a public key generated by the first network device. The processor 301 is configured to generate the first sub-private key based on at least one of the device identifier, the first public validation token, and the first global public key.

In one embodiment, the first parameter set further includes a first verification code, and the second network device verifies the first request based on the first verification code.

In one embodiment, the first verification code is calculated by using at least one of the device identifier, the first public validation token, and the first global public key as an input of a first hash function.

In one embodiment, the first parameter set further includes a first signature and a first certificate, the first signature is a signature of the first network device for the first request, and the first certificate is used to prove an identity of the first network device. The processor 301 is configured to verify the first request based on the first signature and the first certificate.

In one embodiment, the second parameter set includes at least one of a second public validation token and a second global public key, the second public validation token is a public validation token generated by the second network device for the terminal device, and the second global public key is a public key generated by the second network device.

In one embodiment, the second parameter set further includes a second verification code, and the second verification code is used to verify the first response message.

In one embodiment, the second verification code is calculated by using at least one of the first private key, the second public validation token, and the second global public key as an input of a second hash function.

In one embodiment, the second parameter set further includes a second signature and a second certificate, the second signature is a signature of the second network device for the first response message, and the second certificate is used to prove an identity of the second network device.

In one embodiment, the second parameter set includes a hash parameter, the hash parameter is calculated by using the device identifier, the first public validation token, the first global public key, and a second global public key as inputs of a third hash function, and the second global public key is a public key generated by the second network device.

In one embodiment, the hash parameter is calculated based on the third hash function:

$$HS=\text{hash}(KPAK1\|KPAK2\|ID\|PVT),\text{ where}$$

HS is the hash parameter, hash( ) is the third hash function, KPAK1 is the first global public key, KPAK2 is the second global public key, ID is the device identifier, and PVT=PVT1*PVT2, where PVT1 is the first public validation token, and PVT2 is the second public validation token.

It should be noted that, when the apparatus 30 is a terminal device, for execution operations of the processor 301 and other technical features related to the processor 301, refer to related content of the second network device in the method embodiment in FIG. 2. Details are not described herein again.

Based on a same inventive concept, an embodiment of the present invention further provides a network device serving as a first network device (shown in FIG. 5) and a network device serving as a second network device (shown in FIG. 6), to perform the private key generation method described in the embodiment in FIG. 2.

Figure 5:
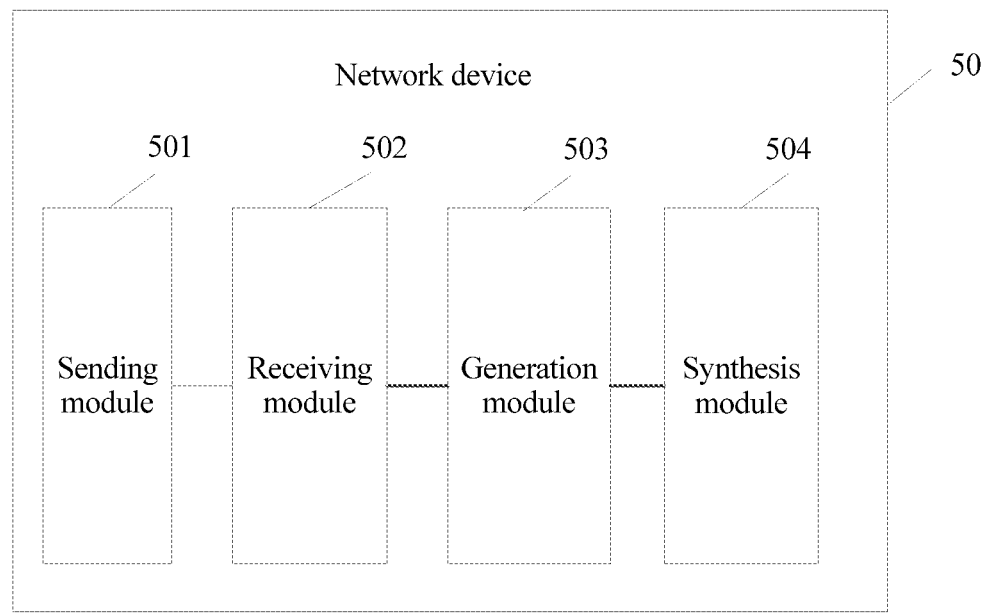
FIG. 5 is a schematic structural diagram of a network apparatus according to an embodiment of the present invention.

As shown in FIG. 5, a network device 50 may include a sending module 501, a receiving module 502, a generation module 503, and a synthesis module 504.

The sending module 501 is configured to send a first request to a second network device. The first request includes a first parameter set.

The receiving module 502 is configured to receive a first response message returned by the second network device. The first response message includes a first sub-private key and a second parameter set, the first sub-private key is generated based on the first parameter set, and the first sub-private key is generated for a terminal device.

The generation module 503 is configured to generate a second sub-private key based on the second parameter set. The second sub-private key is generated for the terminal device.

The synthesis module 504 is configured to synthesize the first sub-private key and the second sub-private key into a joint private key according to a synthesis formula.

It should be noted that according to detailed descriptions of the embodiment in FIG. 2, a person skilled in the art may clearly know an implementation method of each function module included in the network device 50. Therefore, for brevity of the specification, details are not described herein again.

Figure 6:
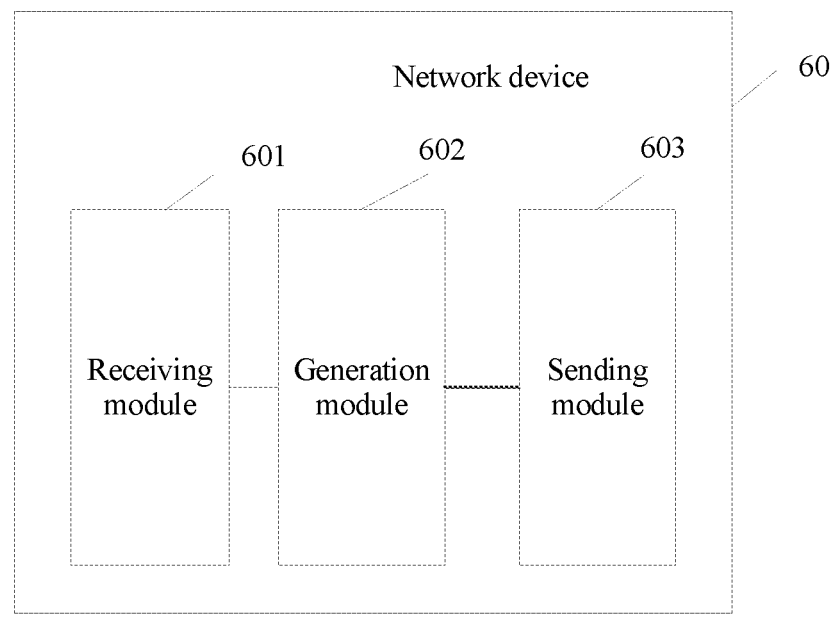
FIG. 6 is a schematic structural diagram of another network apparatus according to an embodiment of the present invention.

As shown in FIG. 6, a network device 60 includes a receiving module 601, a generation module 602, and a sending module 603.

The receiving module 601 is configured to receive a first request sent by a first network device. The first request includes a first parameter set.

The generation module 602 is configured to generate a first sub-private key based on the first parameter set. The first sub-private key is generated for a terminal device.

The sending module 603 is configured to send a first response message to the first network device. The first response message includes the first sub-private key and a second parameter set, the second parameter set is used to generate a second sub-private key, the second sub-private key is generated for the terminal device, and the first sub-private key and the second sub-private key may be synthesized into a joint private key according to a synthesis formula.

It should be noted that according to detailed descriptions of the embodiment in FIG. 2, a person skilled in the art may clearly know an implementation method of each function module included in the network device 60. Therefore, for brevity of the specification, details are not described herein again.

In addition, an embodiment of the present invention further provides a communications system. The communications system includes a first network device and a second network device. The first network device and the second network device are respectively corresponding to the first network device and the second network device in the method embodiment in FIG. 2.

In the embodiments of this application, the second network device generates the first sub-private key, the first network device generates the second sub-private key, and the first network device synthesizes the first sub-private key and the second sub-private key into the joint private key. Because the joint private key is generated based on the first sub-private key, the joint private key can be trusted by the second network device (a telecom operator). In addition, because the joint private key is generated also based on the second sub-private key, the joint private key can also be trusted by the first network device (a vertical industry customer). However, because the second network device knows only the first sub-private key but does not know the second sub-private key, the joint private key is not controlled by the telecom operator.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

In the several embodiments provided in this application, it should be understood that the disclosed system, device, and method may be implemented in other manners. For example, the described embodiment is merely an example. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of this application without creative efforts.

In addition, the schematic diagrams illustrating the system, device, method and different embodiments may be combined or integrated with other systems, modules, technologies or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

What is claimed is:

1. A private key generation system comprising a first network device and a second network device, wherein
    the first network device is configured to send a first request to the second network device, wherein the first request comprises a first parameter set;
    the second network device is configured to generate a first sub-private key based on the first parameter set, wherein the first sub-private key is generated for a terminal device;
    the second network device is configured to send a first response message to the first network device, wherein the first response message comprises a second parameter set and the first sub-private key;
    the first network device is configured to generate a second sub-private key based on the second parameter set, wherein the second sub-private key is generated for the terminal device; and
    the first network device is configured to synthesize the first sub-private key and the second sub-private key to obtain a joint private key.

2. The system according to claim 1, wherein the first parameter set comprises at least one of a device identifier, a first public validation token, or a first global public key, the device identifier is an identifier of the terminal device, the first public validation token is a public validation token generated by the first network device for the terminal device, and the first global public key is a public key generated by the first network device.

3. The system according to claim 2, wherein the first parameter set further comprises a first verification code;
    the second network device, configured to verify the first request based on the first verification code.

4. The system according to claim 3, wherein the first verification code is calculated by using at least one of the device identifier, the first public validation token, or the first global public key as an input of a first hash function.

5. The system according to claim 2, wherein the first parameter set further comprises a first signature and a first certificate, the first signature is a signature of the first network device for the first request, and the first certificate is used to prove an identity of the first network device; and
    the second network device is configured to verify the first request based on the first signature and the first certificate.

6. The system according to claim 1, wherein the second parameter set comprises at least one of a second public validation token or a second global public key, the second public validation token is a public validation token generated by the second network device for the terminal device, and the second global public key is a public key generated by the second network device.

7. The system according to claim 6, wherein the second parameter set further comprises a second verification code; and
    the first network device is configured to verify the first response message based on the second verification code.

8. The system according to claim 7, wherein the second verification code is calculated by using at least one of the first sub-private key, the second public validation token, or the second global public key as an input of a second hash function.

9. The system according to claim 6, wherein the second parameter set further comprises a second signature and a second certificate, the second signature is a signature of the second network device for the first response message, and the second certificate is used to prove an identity of the second network device; and
    the first network device is configured to verify the first response message based on the second signature and the second certificate.

10. The system according to claim 1, wherein the second parameter set comprises a hash parameter, the hash parameter is calculated by using the device identifier, the first public validation token, the first global public key, and a second global public key as inputs of a third hash function, and the second global public key is a public key generated by the second network device; and
    that the first network device is configured to generate a second sub-private key based on the second parameter set includes:
    the first network device is configured to generate the second sub-private key based on the hash parameter.

11. A private key generation method, comprising:
    sending, by a first network device, a first request to a second network device, wherein the first request comprises a first parameter set;
    receiving, by the first network device, a first response message returned by the second network device, wherein the first response message comprises a first sub-private key and a second parameter set, the first sub-private key is generated based on the first parameter set, and the first sub-private key is generated for a terminal device;
    generating, by the first network device, a second sub-private key based on the second parameter set, wherein the second sub-private key is generated for the terminal device; and
    synthesizing, by the first network device, the first sub-private key and the second sub-private key into a joint private key according to a synthesis formula.

12. The method according to claim 11, wherein the first parameter set comprises at least one of a device identifier, a first public validation token, or a first global public key, wherein
    the device identifier is an identifier of the terminal device;
    the first public validation token is a public validation token generated by the first network device for the terminal device; and
    the first global public key is a public key generated by the first network device.

13. The method according to claim 12, wherein the first parameter set further comprises a first verification code, and the first verification code is used to verify the first request.

14. The method according to claim 11, wherein the second parameter set comprises at least one of a second public validation token or a second global public key, the second public validation token is a public validation token generated by the second network device for the terminal device, and the second global public key is a public key generated by the second network device; and the generating, by the first network device, a second sub-private key based on the second parameter set includes:

generating, by the first network device, the second sub-private key based on at least one of the device identifier, the second public validation token, or the second global public key.

15. The method according to claim 14, wherein the second parameter set further comprises a second verification code; and the first network device verifies the first response message based on the second verification code.

16. A network device, comprising a sending module, a receiving module, a generation module, and a synthesis module, wherein the sending module is configured to send a first request to a second network device, wherein the first request comprises a first parameter set;

the receiving module is configured to receive a first response message returned by the second network device, wherein the first response message comprises a first sub-private key and a second parameter set, the first sub-private key is generated based on the first parameter set, and the first sub-private key is generated for a terminal device;

the generation module is configured to generate a second sub-private key based on the second parameter set, wherein the second sub-private key is generated for the terminal device; and the synthesis module is configured to synthesize the first sub-private key and the second sub-private key into a joint private key according to a synthesis formula.

17. The device according to claim 16, wherein the first parameter set comprises at least one of a device identifier, a first public validation token, or a first global public key, wherein the device identifier is an identifier of the terminal device;

the first public validation token is a public validation token generated by the first network device for the terminal device; and the first global public key is a public key generated by the first network device.

18. The device according to claim 17, wherein the first parameter set further comprises a first verification code, and the first verification code is used to verify the first request.

19. The device according to claim 16, wherein the second parameter set comprises at least one of a second public validation token or a second global public key, the second public validation token is a public validation token generated by the second network device for the terminal device, and the second global public key is a public key generated by the second network device; and the generation module is configured to generate the second sub-private key based on at least one of the device identifier, the second public validation token, or the second global public key.

20. The device according to claim 19, wherein the second parameter set further comprises a second verification code, and the first network device verifies the first response message based on the second verification code.

* * * * *